United States Patent
Seigler et al.

(10) Patent No.: US 6,654,209 B2
(45) Date of Patent: Nov. 25, 2003

(54) LOW RESISTANCE LEAD STRUCTURE FOR A LOW RESISTANCE MAGNETIC READ HEAD

(75) Inventors: Michael Allen Seigler, Pittsburgh, PA (US); Petrus Antonius Van der Heijden, Cranberry Township, PA (US); Gregory John Parker, Warrendale, PA (US); Billy Wayne Crue, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 169 days.

(21) Appl. No.: 09/955,776

(22) Filed: Sep. 19, 2001

(65) Prior Publication Data

US 2002/0089795 A1 Jul. 11, 2002

Related U.S. Application Data (60) Provisional application No. 60/260,712, filed on Jan. 10, 2001.

(51) Int. Cl.[7] .............................................. G11B 5/39
(52) U.S. Cl. ...................................... 360/322; 360/319
(58) Field of Search ............................... 360/322, 319, 360/317, 324.1, 324.2

(56) References Cited

U.S. PATENT DOCUMENTS

| | | |
|---|---|---|
| 3,881,190 A | 4/1975 | Brock et al. ............... 360/319 |
| 3,940,797 A | 2/1976 | Brock et al. ............... 360/319 |
| 5,247,413 A | 9/1993 | Shibata et al. ............ 360/319 |
| 5,323,285 A | 6/1994 | Smith ........................ 360/315 |
| 5,446,613 A | 8/1995 | Rottmayer ................ 360/319 |
| 5,576,914 A | 11/1996 | Rottmayer et al. ......... 360/324 |
| 5,668,688 A | 9/1997 | Dykes et al. ............. 360/324.1 |
| 5,731,937 A | 3/1998 | Yuan ........................ 360/322 |
| 5,959,811 A | 9/1999 | Richardson ............... 360/322 |
| 6,134,089 A | 10/2000 | Barr et al. ................ 360/322 |
| 6,198,609 B1 * | 3/2001 | Barr et al. ................ 360/322 |
| 6,219,205 B1 | 4/2001 | Yuan et al. ................ 360/319 |
| 6,233,125 B1 | 5/2001 | Knapp et al. .............. 360/317 |
| 6,249,407 B1 | 6/2001 | Aoshima et al. ......... 360/324.2 |
| 6,493,194 B1 * | 12/2002 | Sakaguchi et al. ......... 360/322 |
| 6,493,195 B1 * | 12/2002 | Hayashi et al. ............ 360/322 |

* cited by examiner

Primary Examiner—Jefferson Evans
(74) Attorney, Agent, or Firm—Benjamin T. Queen, II; Pietragallo, Bosick & Gordon (57) ABSTRACT

A magnetic recording head includes a current perpendicular to the plane read head having a read sensor and a low resistance lead structure. The lead structure includes a layer of conductive material that forms at least a portion of the lead structure such that the layer of conductive material has a lower resistivity than a resistivity of the remainder of the lead structure. The layer of conductive material with lower resistivity decreases the overall resistance of the lead structure.

22 Claims, 5 Drawing Sheets

LOW RESISTANCE LEAD STRUCTURE FOR A LOW RESISTANCE MAGNETIC READ HEAD

CROSS REFERENCE TO RELATED APPLICATION

This application claims the benefit of United States Provisional Application No. 60/260,712 filed Jan. 10, 2001.

FIELD OF THE INVENTION

The invention relates to magnetic recording heads, and more particularly, to a lead structure for a read head of such recording heads.

BACKGROUND OF THE INVENTION

Devices utilizing the giant magnetoresistance (GMR) effect have utility as magnetic sensors, especially as read sensors in read heads used in magnetic disc storage systems. The GMR effect is observed in thin, electrically conductive multi-layer systems having magnetic layers. A type of magnetic sensor utilizing the GMR effect is referred to as a "spin valve" sensor.

A spin valve sensor may include a sandwiched structure having two ferromagnetic layers separated by a thin non-ferromagnetic layer. One of the ferromagnetic layers is called the "pinned layer" because it is magnetically pinned or oriented in a fixed and unchanging direction. A common method of maintaining the magnetic orientation of the pinned layer is through exchange coupling utilizing a proximate, i.e. adjacent or nearby, anti-ferromagnetic layer, commonly referred to as the "pinning layer." The other ferromagnetic layer is called the "free" or "unpinned" layer because its magnetization can rotate in response to the presence of external magnetic fields.

The benefits of spin valve sensors result from a large difference in electrical conductivity exhibited by the devices depending on the relative alignment between the magnetizations of the GMR element ferromagnetic layers. In order for antiferromagnetically pinned spin valve sensors to function effectively, a sufficient pinning field from the pinning layer is required to keep the pinned ferromagnetic layer's magnetization unchanged during operation. Various antiferromagnetic materials, such as PtMn, NiMn, FeMn, NiO, IrMn, PtPdMn, CrMnPt, RuRhMn, and TbCo, have been used or proposed as antiferromagnetic pinning layers for spin valve sensors. GMR sensors can be used to sense information encoded in magnetic storage media. In operation, a sense current is passed through a read head of the magnetic disc storage system. The presence of a magnetic field in the storage media adjacent to the sensor changes the resistance of the sensor. A resulting change in voltage drop across the sensor due to the change of the resistance of the sensor can be measured and used to recover magnetically stored information.

These sensors typically comprise a stack of thin sheets of a ferromagnetic alloy, such as NiFe (Permalloy), magnetized along an axis of low coercivity. The sheets may be mounted in the read head so that, for example, the magnetic axes are transverse to the direction of disc rotation for the pinned layer and parallel to the plane of the disc for the free layer. The magnetic flux from the disc causes rotation of the magnetization vector in at least one of the sheets, which in turn causes a change in resistivity of the sensor.

A read head for use in a disc drive can include a first shield, a second shield, and a GMR sensor, or also referred to as a GMR stack, located between the first shield and the second shield. For operation of the sensor, a sense current is caused to flow through the read head and particularly through the sensor. As resistance of the sensor changes, the voltage across the sensor changes. This is used to produce an output voltage.

The output voltage is affected by various characteristics of the sensor. The sense current can flow through the sensor in a direction that is perpendicular to the planes of the layers or stack strips that comprise the sensor, i.e. current-perpendicular-to-plane component or CPP, or the sense current can flow through the sensor in a direction that is parallel to the planes of the layers or stack strips, i.e. current-in-plane or CIP. The CPP operating mode can result in higher output voltage than the CIP operating mode. The higher the output voltage, the greater the precision and sensitivity of the read head sensor in sensing magnetic fields from the magnetic medium. Therefore, it is desirable to maximize the output voltage of the read head and specifically the sensor thereof.

Current perpendicular to the plane GMR sensors are known to have a relatively low resistance. There have been three primary approaches to overcoming the problem of low sensor resistance of CPP giant magnetoresistance (GMR) sensors and allowing the GMR to be measured. One approach uses superconducting contacts and measures the GMR at low temperatures. A second approach involves making the sensor or GMR stack very thick to raise its resistance. A third approach involves making a very small sensor or GMR stack to increase its resistance. The first two approaches are not practical when it comes to the making of the CPP-GMR sensor for use in a magnetic recording head. The disc drive cannot run at very low temperatures nor can the sensor be more than 100's of nanometers thick. The two main problems with the third approach relate to manufacturing the small devices and achieving a low contact resistance. The contact resistance is significant for small devices since the contact resistance varies as the inverse of the sensor area.

In addition to the importance of having a low contact resistance between the lead and the sensor, it is also important to have a low lead resistance leading up to this contact. Specifically, a relatively high lead resistance will decrease the overall GMR effect making the GMR more difficult to measure.

There is a need for an improved low resistance lead structure for a magnetic recording head.

SUMMARY OF THE INVENTION

The invention meets the identified need, as well as other needs, as will be more fully understood following a review of this specification and drawings.

In accordance with an aspect of the invention, a current perpendicular to the plane read head comprises a read sensor and a lead structure positioned adjacent to read sensor. The lead structure includes a layer of conductive material that forms at least a portion thereof, wherein the layer of conductive material has a lower resistivity than a resistivity of the remainder of the lead structure. The layer of conductive material with lower resistivity decreases the overall resistance of the lead structure. By reducing the overall lead structure resistance, the read sensor is allowed to more efficiently perform its intended function. In order to decrease the overall resistance of the lead structure, the layer of conductive material may be deposited on the lead structure either proximate to the read sensor or positioned for contact with the read sensor.

In accordance with another aspect of the invention, a current perpendicular to the plane read head comprises a read sensor and a lead structure positioned adjacent the read sensor. The lead structure includes means for reducing the resistivity of the lead structure.

In accordance with yet another aspect of the invention, a read head for a magnetic disc storage system comprises first and second lead structures and a current perpendicular to the plane read sensor between the first and second lead structures. Each of the first and second lead structures include a layer of conductive material that forms at least a portion thereof. The layers of conductive material have a lower resistivity than a resistivity of the remainder of the first and second lead structures.

In accordance with a further aspect of the invention, a read head for a magnetic disc storage system comprises first and second lead structures and a current perpendicular to the plane read sensor between the first and second lead structures. At least one of the first and second lead structures includes means for reducing the resistivity of the first and second lead structures.

In accordance with another aspect of the invention, a magnetic disc drive storage system comprises a housing, a rotatable magnetic storage medium positioned in the housing and a movable recording head mounted in the housing adjacent the magnetic storage medium. The recording head includes a current perpendicular to the plane read head. The current perpendicular to the plane read head comprises first and second lead structures and a current perpendicular to the plane read sensor between the first and second lead structures. Each of the first and second lead structures include a layer of conductive material deposited on at least a portion thereof to form the lead structures and the layers of conductive material have a lower resistivity than a resistivity of the remainder of the first and second lead structures.

In accordance with an aspect of the invention, a magnetic recording head comprises a magnetic sensor element and a lead structure positioned adjacent to the sensor element. The lead structure includes a layer of conductive material that forms at least a portion thereof, wherein the layer of conductive material has a lower resistivity than a resistivity of the remainder of the lead structure. The layer of conductive material with lower resistivity decreases the overall resistance of the lead structure.

In accordance with an additional aspect of the invention, a method of making a lead structure for a current perpendicular to the plane read head comprises the steps of forming a first layer of the lead structure as an integrally formed lead element and magnetic shield and forming on at least a portion of the first layer a second layer having a lower resistivity than a resistivity of the first layer.

In accordance with a further aspect of the invention, a method of using a current perpendicular to the plane read head to read data in a magnetic disc storage system comprises providing a lead structure having a layer of conductive material that forms at least a portion thereof, the layer of conductive material having a lower resistivity than the resistivity of the remainder of the lead structure. The method further comprises providing a read sensor and passing a sense current through the lead structure and the read sensor. The sense current that is passed through the lead structure is concentrated in the layer of conductive material having a lower resistivity. The method may also include forming the layer of conductive material on the lead structure so as to focus the sense current towards the read sensor.

BRIEF DESCRIPTION OF THE DRAWINGS

FIG. 3b is an additional embodiment of the invention, similar to the portion of a read head shown in FIG. 3a.

FIG. 3c is an additional embodiment of the invention, similar to the portion of a read head shown in FIG. 3a.

FIG. 3d is an additional embodiment of the invention, similar to the portion of a read head shown in FIG. 3a.

DETAILED DESCRIPTION OF THE INVENTION

The invention provides a low resistance lead structure for a magnetic recording head, particularly suitable for use with a magnetic disc storage system. A recording head is defined as a head capable of performing read and/or write operations, or performing magnetic sensor operations in general.

Figure 1:
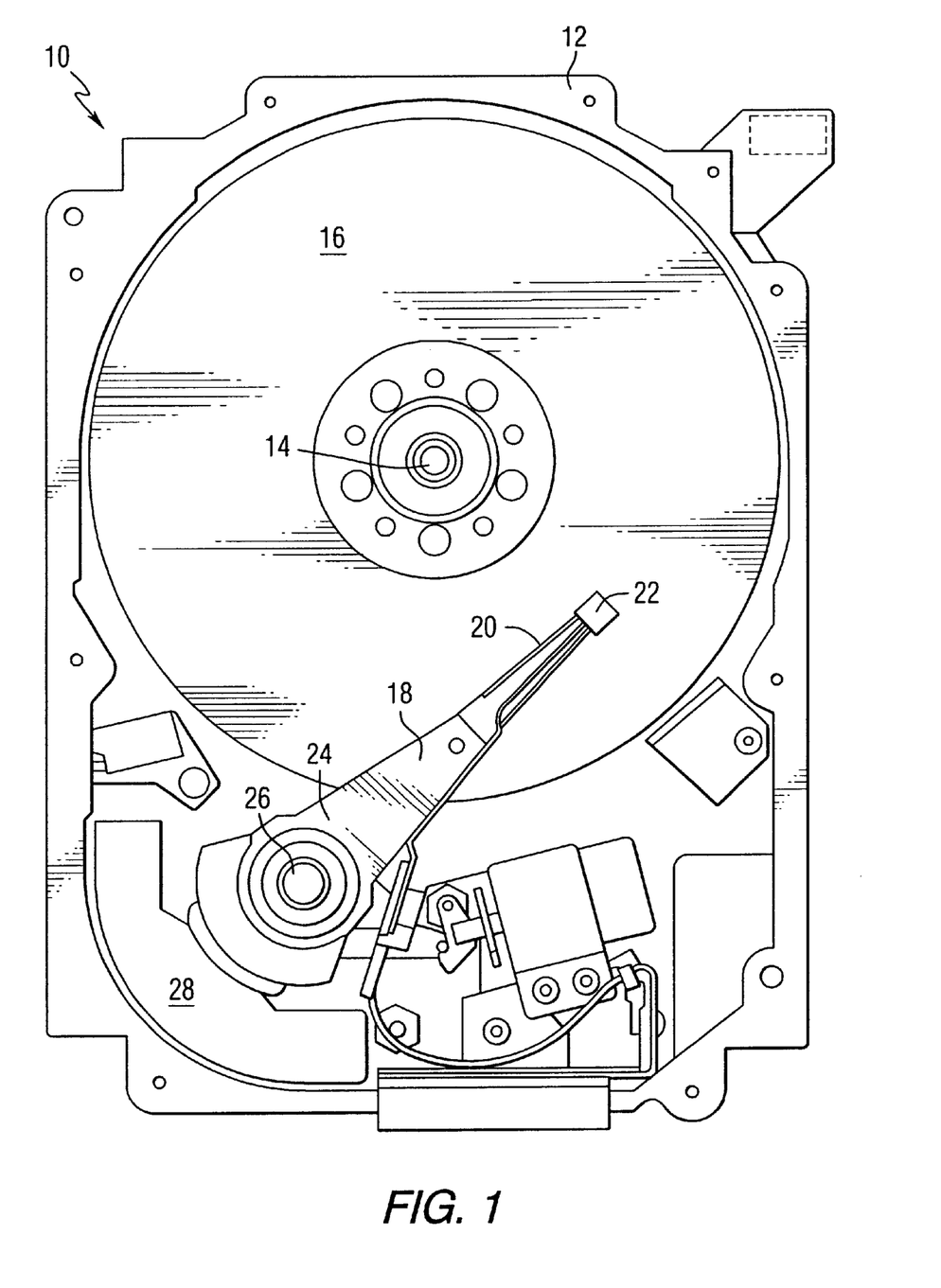
FIG. 1 is a pictorial representation of a disc drive that can use a low resistance lead structure constructed in accordance with this invention.

FIG. 1 is a pictorial representation of a disc drive 10 that can utilize the lead structure and read head constructed in accordance with this invention. The disc drive includes a housing 12 (with the upper portion removed and the lower portion visible in this view) sized and configured to contain the various components of the disc drive. The disc drive includes a spindle motor 14 for rotating at least one magnetic storage medium 16 within the housing, in this case a magnetic disc. At least one arm 18 is contained within the housing 12, with each arm 18 having a first end 20 with a recording and/or read head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

Figure 2:
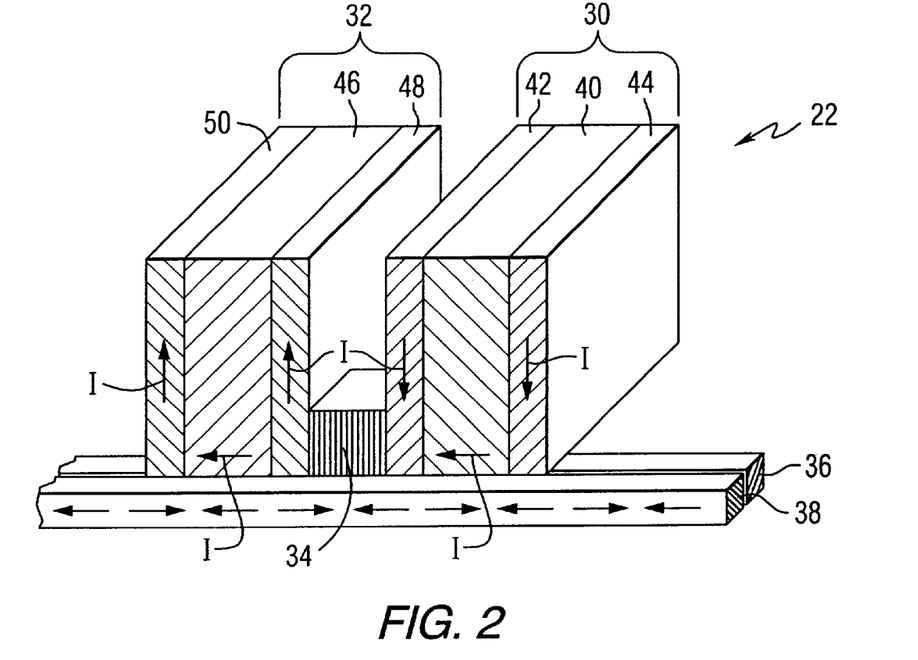
FIG. 2 is an isometric sectional view of a portion of a read head having a low resistance lead structure constructed in accordance with this invention.

FIG. 2 is a cross-sectional view of a portion of a read head 22 constructed in accordance with this invention. The read head 22 includes first and second lead structures 30 and 32 positioned on opposite sides of a read sensor 34. The read head 22 is configured to fly adjacent to a magnet recording medium 16 having a plurality of tracks, illustrated by tracks 36, 38. The tracks 36,38 contain magnetic domains capable of storing digital information according to the polarity of magnetization thereof and may provide for longitudinal or perpendicular media recording. The magnetic domains are illustrated by arrows, shown in track 38 only in FIG. 2. The lead structures 30 and 32 are used to supply a constant current I that flows through the lead structures 30 and 32 and the read sensor 34 in a current perpendicular to the plane (CPP) direction. When the read sensor 34 is subjected to an external magnetic field, the resistance of the GMR stack that forms the read sensor 34 changes, thereby changing the voltage across the stack. The stack voltage is then used to produce an output voltage. Alternatively, a constant voltage may be applied and the current measured. In addition, it will be appreciated that while the description set forth herein is directed to a GMR type sensor, the invention is also applicable to other type sensors such as magnetoresistance (MR) sensors, inductive sensors, or other magnetic field sensors. It will also be appreciated that the sensor 34 may be, for example, a spin valve type sensor or a multilayer stack sensor having, for example, a nx (magnetic/non-magnetic) multilayer arrangement.

The lead structure 30 includes an integrally formed lead element and magnetic shield 40. The lead structure 30 also includes a layer of conductive material 42 that forms at least a portion of the lead structure 30. The lead structure 30 may also include an additional layer of conductive material 44 that forms another portion of the lead structure 30. Similarly, the lead structure 32 includes an integrally formed lead element and magnetic shield 46 and a layer of conductive material 48 that forms at least a portion of the lead structure 32. The lead structure 32 may also contain an additional layer of conductive material 50 that forms another portion of the lead structure 32. It will be appreciated that lead structure 30 is positioned relative to the read sensor 34 such that the current flows through the lead structure 30 and into the read sensor 34. The lead structure 32 is positioned relative to the read sensor 34 such that the current flows through the read sensor 34 and into the lead structure 32. While lead structures 30 and 32 are shown in FIG. 2 as being essentially identical, it will be appreciated that lead structures 30 and 32 may be differently configured in accordance with the invention.

In accordance with the invention, the layers of conductive material 42, 44 and 48, 50 are made of a material selected to have a lower resistivity than a resistivity of the remainder of the lead structures 30, 32, and specifically a lower resistivity of the integrally formed lead element and magnetic shield 40 and 46 of each lead structure. The integrally formed lead element and magnetic shield 40 and 46 of each lead structure 30 and 32 may be formed of, for example, NiFe and CoNiFe. Such materials, while not necessarily having a relatively low resistance, do provide a material that is both conductive and capable of providing magnetic shielding. The layers of conductive material 42, 44 and 48, 50 may be a material that is selected from the group, for example, Cu, Au, Ag, Ta, Cr and Rh.

As described, the read head 22 illustrated in FIG. 2 is a CPP read head having a read sensor 34, that may be a giant magnetoresistive or magnetoresistance (GMR) type sensor. Such sensors are known to have a relatively low resistance making the GMR more difficult to measure. The overall lead resistance present in the lead structures 30 and 32 have a direct impact on the overall GMR from the read sensor 34. Specifically, a relatively high lead resistance will decrease the overall GMR effect making the GMR even more difficult to measure. By constructing the lead structures 30 and 32 to include one or more layers of conductive material 42, 44 and 48, 50 which have a lower resistivity than a resistivity of the remaining portions of the lead structures 30 and 32, specifically a lower resistivity than the integrally formed lead element and magnetic shield portions 40 and 46, the overall lead resistance is reduced.

Figure 3A:
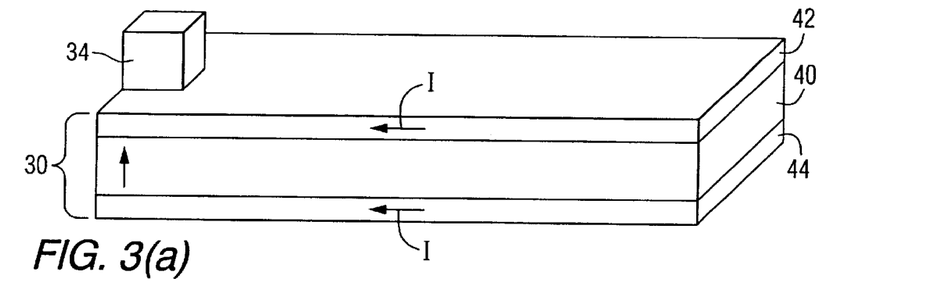
FIG. 3a is an isometric view of a portion of the read head illustrated in FIG. 2.
Figure 3B:
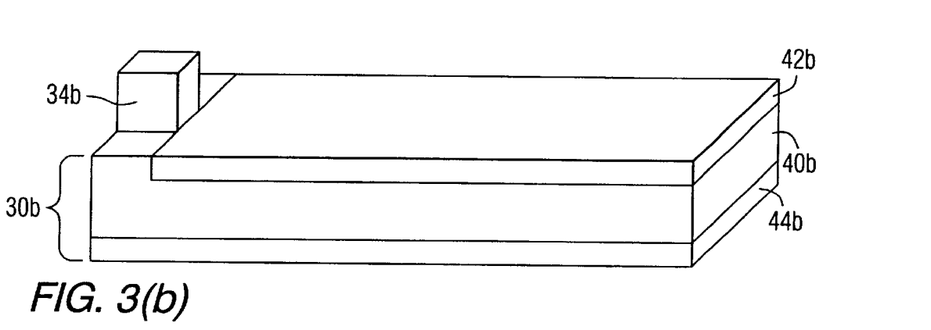
Figure 3C:
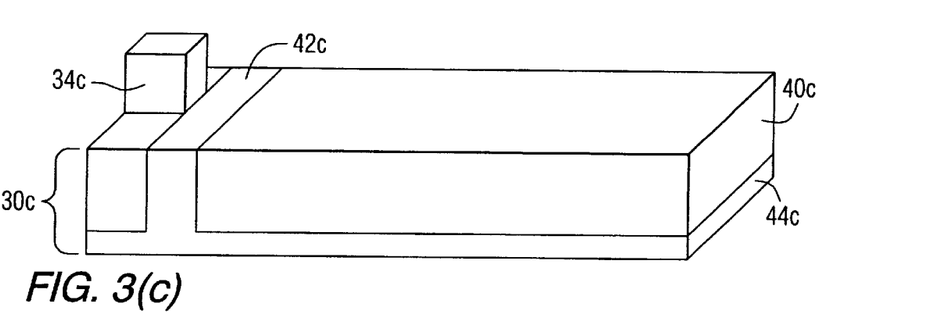
Figure 3D:
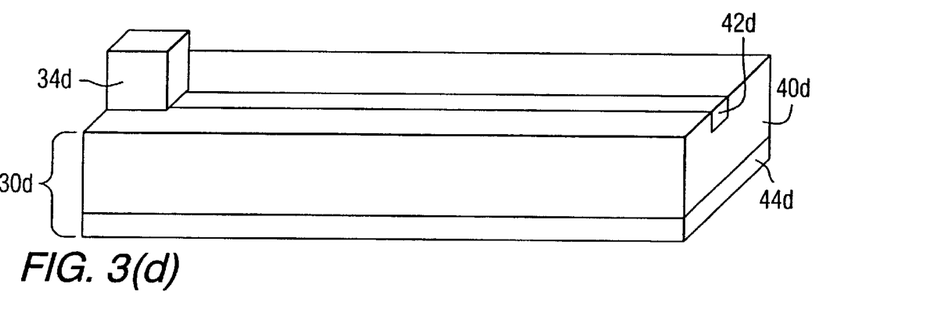

FIG. 3a is a partial view of the read head 22 illustrated in FIG. 2. FIGS. 3b, 3c and 3d are views similar to FIG. 3a that illustrate additional embodiments of lead structures 30b, 30c and 30d, respectively, constructed in accordance with the invention. Specifically, lead structure 30b includes an integrally formed lead element and magnetic shield 40b. Lead structure 30b also includes layers of conductive material 42b and 44b which have a lower resistivity than the remainder of the lead structure 30b. The layer of conductive material 42b is positioned adjacent or proximate to the read sensor 34b. Similarly, lead structure 30c includes layers of conductive material 42c and 44c with the layer 42c being adjacent or proximate to read sensor 34c. In addition, lead structure 30d, includes layers of conductive material 42d and 44d with the layer of conductive material 42d being positioned adjacent or proximate to the read sensor 34d. It will be appreciated that the lead structures illustrated in FIGS. 3a –3d are examples of differently configured lead structures constructed in accordance with the invention, but that additional configurations of lead structures may be utilized in accordance with the invention. The layers of conductive material are formed as part of the lead structure such that the layers of conductive material are, for example, adjacent to the read sensor, proximate to the read sensor and/or positioned for contact with the read sensor. Although not shown in FIGS. 3b, 3c and 3d, it will be appreciated that additional lead structures corresponding to lead structure 32 illustrated in FIGS. 2 and 3a may be provided such that the additional lead structures not shown may have the same configuration as the corresponding lead structures 30b, 30c and 30d, or the additional lead structures may have different configurations in accordance with the invention.

Figure 4:
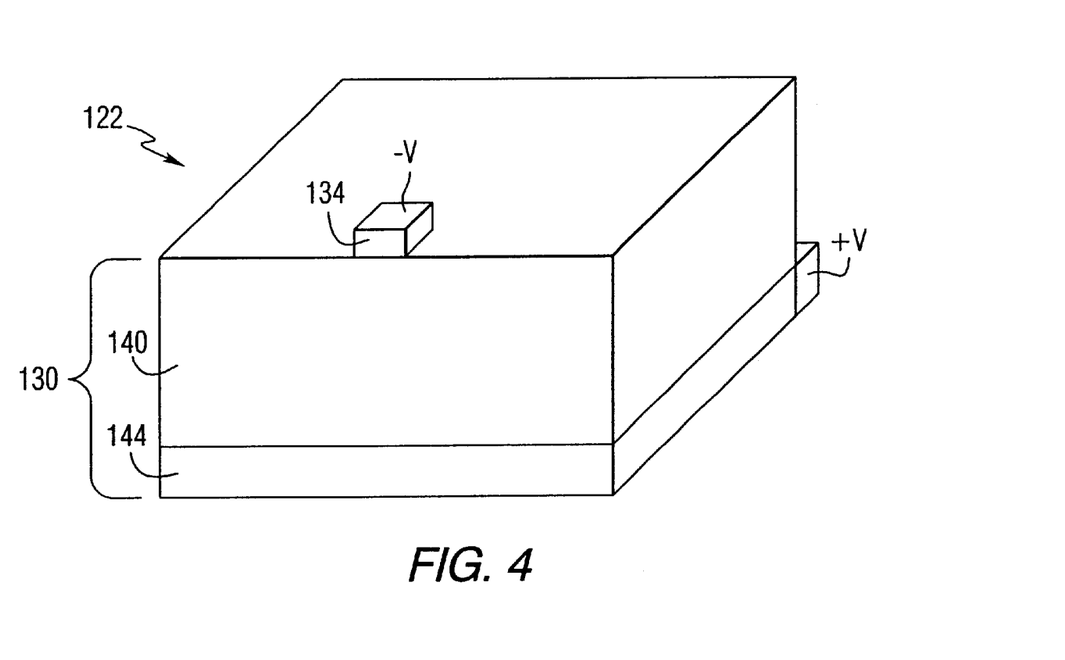
FIG. 4 is an isometric view of a further embodiment of a portion of a read head constructed in accordance with the invention for modeling aspects of the invention.
Figure 5:
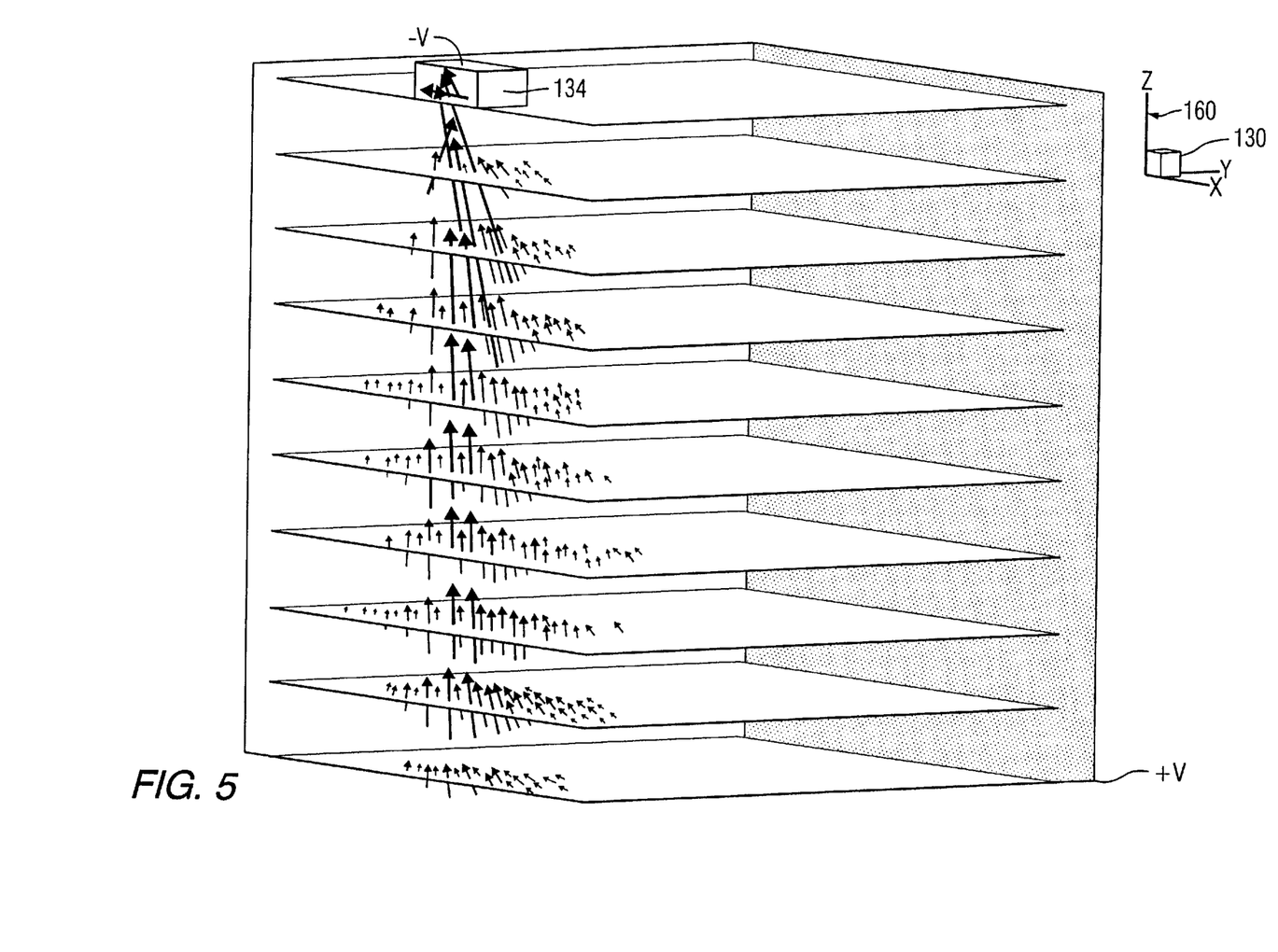
FIG. 5 is a graphical representation of measured current distribution as modeled for the read head portion shown in FIG. 4.

Referring to FIGS. 4 and 5, the aspect of the invention for decreasing the overall lead resistance in a lead structure will be described in more detail. FIG. 4 is a partial view of a read head 122 constructed in accordance with the invention and modeled to determine current distribution, as shown in FIG. 5, to illustrate how the overall lead resistance can be reduced. Specifically, the read head 122 includes a lead structure 130 having an integrally formed lead element and magnetic shield 140 and a layer of conductive material 144. The lead structure 130 was modeled by applying a uniform potential of +V to the conductive material 144 and a uniform potential of –V where the representative read sensor 134 would be located.

Referring to FIG. 5 (wherein the numerous arrows represent the direction of current flow between +V and –V), the current distribution through the lead structure 130 is illustrated. For reference purposes, a coordinate grid is shown at 160 for proper orientation of the lead structure 130 in the graphical illustration. The current is shown as staying primarily in the layer of conductive material 144, which has a lower resistivity than the integrally formed lead element and magnetic shield 140 of the lead structure 130, until the current nears the end of the layer of conductive material 144. The current then focuses toward the representative sensor 134 and then enters the representative sensor 134. Due to this focusing effect, the majority of the resistance between +V and –V (i.e. lead structure resistance) comes from the region near the representative sensor 134 where the current focuses towards the representative sensor 134. This is a result of the the area decreasing as the current focuses down toward the representative sensor 134. The smaller the representative sensor 134, the smaller the area in which the current has to focus. While the current distribution has been illustrated and described for lead structure 130, which is the lead structure through which a current flows prior to entering the representative sensor 134, it will be appreciated that essentially the same principles apply to an additional lead structure from which the current would leave the representative sensor 134 and flow through.

Figure 6:
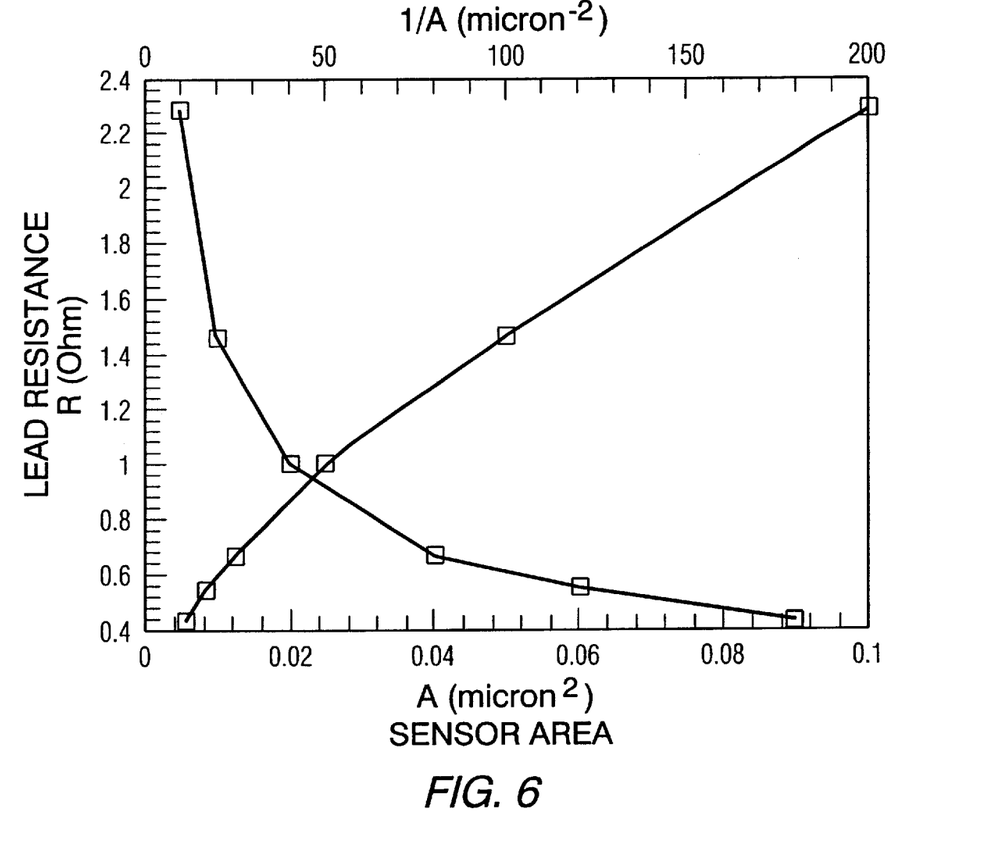
FIG. 6 is a graphical illustration of the relationship between lead resistance and read sensor area.

FIG. 6 illustrates the lead resistance R as a function of sensor area A. Once the sensor becomes small enough and the resistance is dominated by the region where the current has to focus down, the lead resistance varies approximately inversely with the sensor area. Based upon these modeling results, it is evident that getting a low resistivity material as close to the read sensor as possible would be advantageous. This can be achieved by either making a shield material that has a relatively low resistivity or by placing a non-magnetic relatively low resistivity material near the read sensor. However, placement of a low resistivity material close to the read sensor must be done so as to maintain allowable shield-to-shield spacing requirements. For differential sense read sensors, where the linear density is not set by the shield-to-shield spacing, the highly conductive non-magnetic material could be inserted between the read sensor and the shield without decreasing the maximum achievable linear density. Accordingly, the low resistivity material is most advantageous when positioned as close to the read sensor as possible without jeopardizing the shielding capability of the shielding material employed in the lead structure.

The invention also includes a method of making a lead structure, such as lead structure 30, for a CPP read head, such as read head 22. The method includes forming a first layer of the lead structure as an integrally formed lead element and magnetic shield, such as the layer 40 of the lead structure 30. The method further includes forming on at least a portion of the first layer a second layer, such as the layer of conductive material 42 and/or 44, which has a lower resistivity than a resistivity of the first layer. The layers of the lead structure may be formed using, for example, standard deposition or forming techniques. In accordance with the invention, the second layer or layer of conductive material may have a thickness in the range of 100 to 10,000 angstroms. In addition, the layer of conductive material 42 and/or 44 may be configured in different arrangements, such as shown, for example, in FIGS. 3a–3d.

The invention also includes a method of using a CPP read head such as read head 22, to read data in a magnetic disc storage system, such as the disc drive 10. The method includes providing a lead structure, such as lead structure 30, having a layer of conductive material, such as layer 42 and/or 44, that forms at least a portion of the lead structure. The layers of conductive material, as discussed herein, are a material selected to have a lower resistivity than the resistivity of the remainder of the lead structure. The method also includes providing a read sensor, such as read sensor 34, adjacent to the lead structure. The method further includes passing a sense current through the lead structure and the read sensor such that the sense current passing through the lead structure is concentrated in the layer of conductive material which has a lower resistivity. The method may further comprise forming the layer of conductive material of the lead structure so as to focus the sense current toward the read sensor.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A current perpendicular to the plane read head, comprising:
    a read sensor; and
    a lead structure positioned adjacent said read sensor, said lead structure including an integrally formed lead/magnetic shield layer and a layer of conductive material having a lower resistivity than a resistivity of the lead/magnetic shield layer, said lead/magnetic shield layer and said layer of conductive material structured and arranged to provide parallel sense current paths in at least a portion of said lead/magnetic shield layer and a corresponding portion of said layer of conductive material.

2. The read head of claim 1, wherein said layer of conductive material is a material selected from the group consisting of Cu, Au, Ag, Ta, Cr and Rh.

3. The read head of claim 1, wherein said layer of conductive material is proximate to said read sensor.

4. The read head of claim 1, wherein said layer of conductive material is in contact with said read sensor.

5. The read head of claim 1, wherein said read sensor is a giant magnetoresistive sensor.

6. The read head of claim 1, wherein said layer of conductive material has a thickness in the range of 100 to 10,000 angstroms.

7. The read head of claim 1, wherein said lead structure includes an additional layer of conductive material that forms another portion of said lead structure.

8. The read head of claim 1, further comprising an additional lead structure positioned adjacent said read sensor such that said read sensor is between said lead structure and said additional lead structure.

9. A current perpendicular to the plane read head, comprising:
    a read sensor; and
    a lead structure positioned adjacent said read sensor, said lead structure including means for providing parallel sense current paths in at least corresponding portions of said lead structure that have differing resistivities for reducing the resistivity of said lead structure.

10. A read head for a magnetic disc storage system, comprising:
    first and second lead structures each including an integrally formed lead/magnetic shield layer and a layer of conductive material having a lower resistivity than the resistivity of the lead/magnetic shield layer, said lead/magnetic shield layer and said layer of conductive material structured and arranged to provide parallel sense current paths in at least a portion of said lead/magnetic shield layer and a corresponding portion of said layer of conductive material; and
    a current perpendicular to the plane read sensor between the first and second lead structures.

11. The read head of claim 10, wherein said layers of conductive material are a material selected from the group consisting of Cu, Au, Ag, Ta, Cr and Rh.

12. The read head of claim 10, wherein said layers of conductive material are proximate to said read sensor.

13. The read head of claim 10, wherein said layers of conductive material are in contact with said read sensor.

14. The read head of claim 10, wherein said read sensor is a giant magnetoresistive sensor.

15. The read head of claim 10, wherein said layers of conductive material have a thickness in the range of 100 to 10,000 angstroms.

16. The read head of claim 10, wherein each said lead structure includes an additional layer of conductive material that forms another portion of said lead structures.

17. A read head for a magnetic disc storage system, comprising:
    first and second lead structures, at least one of said first and second lead structures including means for providing parallel sense current paths in at least corresponding portions of said lead structure that have differing resistivities for reducing the resistivity of said first and second lead structures; and a current perpendicular to the plane read sensor between the first and second lead structures.

18. A magnetic recording head, comprising:

a magnetic sensor element; and a lead structure positioned adjacent said read sensor, said lead structure including an integrally formed lead/magnetic shield layer and a layer of conductive material having a lower resistivity than a resistivity of the lead/magnetic shield layer, said lead/magnetic shield layer and said layer of conductive material structured and arranged to provide parallel sense current paths in at least a portion of said lead/magnetic shield layer and a corresponding portion of said layer of conductive material.

19. A magnetic disc drive storage system, comprising:

a housing; and a rotatable magnetic storage medium positioned in said housing; and a movable recording head mounted in said housing adjacent said magnetic storage medium, said recording head including a current perpendicular to the plane read head comprising:

first and second lead structures each including an integrally formed lead/magnetic shield layer and a layer of conductive material having a lower resistivity than the resistivity of the lead/magnetic shield layer, said lead/magnetic shield layer and said layer of conductive material structured and arranged to provide parallel sense current paths in at least a portion of said lead/magnetic shield layer and a corresponding portion of said layer of conductive material; and a current perpendicular to the plane read sensor between the first and second lead structures.

20. A method of making a lead structure for a current perpendicular to the plane read head, comprising:

forming a first layer of said lead structure as an integrally formed lead element and magnetic shield; and forming on at least a portion of said first layer a second layer having a lower resistivity than a resistivity of said first layer, wherein said first layer and said second layer are structured and arranged to provide parallel current paths in at least a portion of said first layer and a corresponding portion of said second layer.

21. A method of using a current perpendicular to the plane read head to read data in a magnetic disc storage system, comprising:

providing a lead structure having an integrally formed lead/magnetic shield layer and a layer of conductive material having a lower resistivity than the lead/magnetic shield layer;

providing a read sensor adjacent said lead structure; and passing a sense current through said lead structure and said read sensor such that said sense current passing through said lead structure is concentrated in said layer of conductive material having a lower resistivity, said lead/magnetic shield layer and said layer of conductive material structured and arranged to provide parallel sense current paths in at least a portion of said lead/magnetic shield layer and a corresponding portion of said layer of conductive material.

22. The method of claim 21, further comprising forming said layer of conductive material on said lead structure so as to focus said sense current toward said read sensor.

* * * * *